March 16, 1937.　　H. C. EDWARDS　　2,073,866
PISTON
Filed March 29, 1935
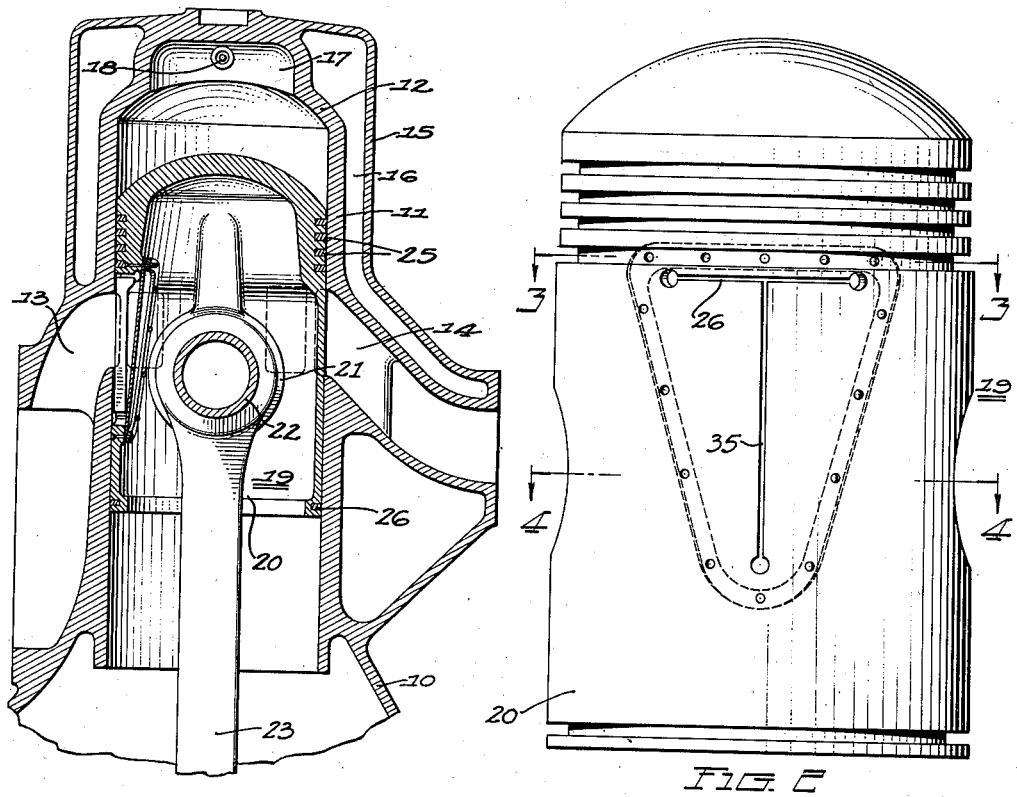
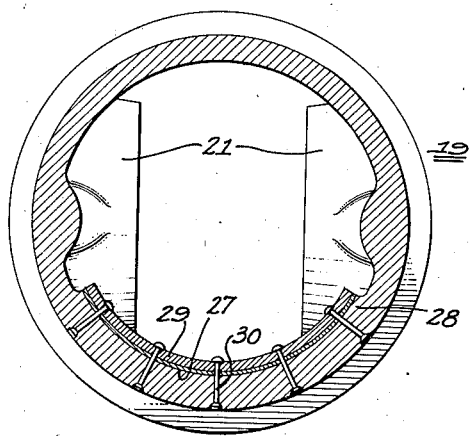
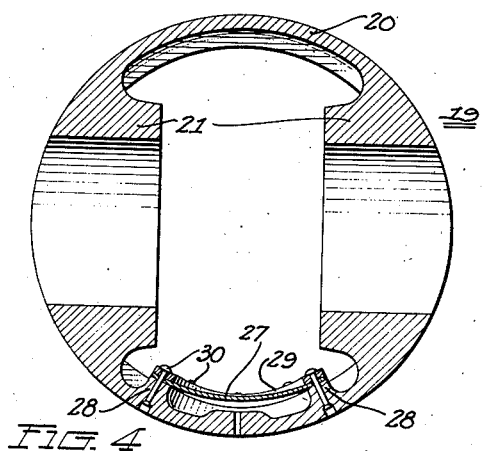
Inventor
HERBERT C. EDWARDS
By Tibbetts and Hart
Attorneys Patented Mar. 16, 1937

2,073,866

UNITED STATES PATENT OFFICE 2,073,866

PISTON

Herbert C. Edwards, Detroit, Mich., assignor to Packard Motor Car Company, Detroit, Mich., a corporation of Michigan Application March 29, 1935, Serial No. 13,659

10 Claims. (Cl. 309—11)

This invention relates to internal combustion engines and more particularly to pistons.

In many types of internal combustion engines it is customary to form the cylinders and the pistons of different materials in order to improve the wearing conditions. The piston temperature during operation of the engine becomes higher than the cylinder temperature due mainly to the fact that the cylinder is cooled either by air or water and hence the piston will expand a greater extent than the cylinder will when heated. The temperature of the piston becomes greatest at the point of greatest mass, which is usually the piston pin bosses, so that the greatest expansion takes place diametrically of the piston pin bosses.

In order to relieve this expansion so that the piston will not seize in the cylinder or expand to an extent causing undue wear, a slot is often formed in the piston. Slotted pistons cannot be used with engines in which the piston controls the air inlet ports and/or the exhaust outlet ports because the slot provides an opening through which air and/or exhaust can move into the crank case or through which oil from the crank case can pass outwardly into the inlet or the outlet passages.

An object of this invention is to provide a piston of the slotted type with an adapter or slot sealing means so that it can be used with engines of the type in which the piston controls the air inlet passages and/or the exhaust outlet passages.

Another object of the invention is to provide a piston structure for two-cycle engines in which the skirt portion is relieved to allow for expansion.

A further object of the invention is to provide sealing means for the slotted portion of a piston which is of a character offering minimum resistance to contraction and expansion of the piston.

Other objects of the invention will appear from the following description taken in connection with the drawing which forms a part of this specification, and in which:

Fig. 1 is a vertical sectional view of a portion of an internal combustion engine with a piston incorporating my invention associated therewith;

Fig. 2 is an enlarged elevational view of the piston structure;

Fig. 3 is a sectional view of the piston structure taken on line 3—3 of Fig. 2;

Fig. 4 is another view of the structure taken on line 4—4 of Fig. 2.

Referring now to the drawing by characters of reference, 11 designates the cylinder of an internal combustion engine. A head 12 is integrally associated with one end of the cylinder and a crank case 10 is integrally associated with the other end of the cylinder. Leading to the interior of the cylinder are air inlet passages 13 and leading from the interior of the cylinder are exhaust outlet passages 14. Surrounding the main portion of the cylinder and the exhaust passages is a jacket 15 forming a space 16 through which a cooling medium is circulated.

Formed in the head of the cylinder is a combustion chamber 17, of less diameter than the cylinder, into which extends a device 18 for injecting liquid fuel. Mounted to reciprocate in the cylinder is arranged a piston 19 operating to move air into and to expel exhaust from the interior of the cylinder. The piston skirt 20 is formed with diametric bosses 21 for receiving pin 22 on which rod 23 is mounted. The head end of the piston is formed with grooves for receiving compression sealing rings 25 and the skirt of the piston is formed with a groove for receiving an oil sealing ring 26.

The engine structure so far described is of the conventional two-cycle design. The piston controls the air and exhaust passages, induces inflow of air and displacement of exhaust, and compresses the air charges into which fuel is injected by the device 18.

Under the heat of combustion the piston expands and the greatest expansion is in a direction in alignment with the axes of the bosses. This expansion causes distortion which would result in the piston seizing in the cylinder or in undue frictional contact between certain portions of the piston and the cylinder. In order to relieve the piston during high temperature conditions it is customary to provide a slot in the skirt portion thereof. As shown, this slot is of T-form consisting of a portion 35 extending axially of the piston and terminating adjacent the head end of the piston in a portion 26 extending normal to the axis of the piston.

As previously related a piston so relieved cannot be used with engines in which the inlet and/or the outlet passages are controlled by the piston because the slot will permit air and/or exhaust to pass into the interior of the crank case and it will allow oil from the crank case to escape into the inlet and/or the outlet passages. It is the main purpose of this invention to provide adapter means for sealing the slotted portion of the piston so that it can be used with an engine in which the piston controls the inlet passages and/or the outlet passages. To this end there is provided a sealing plate 27 suitably secured interiorly of the piston to enclose the slot. The plate is preferably formed of thin flexible metal cut to overlie a triangular boss 28 extending inwardly of the piston skirt and surrounding the slot. A retainer 29, similar in design to the boss, engages the interior face of the sealing plate and suitable means, such as rivets 30, are used to secure the retainer and the sealing plate to the boss. The sealing plate offers small resistance to expansion and contraction of the piston due to its flexibility and it will withstand extensive use.

This form of adapter permits the use of a relieved piston in an engine wherein the piston controls the air inlet and/or the exhaust outlet passages and as a result compression pressure can be better maintained, higher temperatures in the piston are permitted and deformation of the piston causing seizing or undue wear from distortion is materially reduced.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a piston structure, the combination with a hollow skirt having a slot therethrough to allow for contraction and expansion thereof, of means permanently shutting off the slot from the interior of the piston without interfering with the contraction and expansion of said skirt.

2. In a piston structure, the combination with a hollow skirt having a T-slot therethrough to allow for contraction and expansion thereof, of means permanently shutting off communication between the slot and the interior of the piston without interfering with the contraction and expansion of the skirt.

3. In a piston structure, the combination with a hollow skirt having a slot extending therethrough, of a flexible metal plate secured interiorly of the skirt to permanently shut off communication between the slot and the interior of the piston structure.

4. In a piston structure, the combination with a hollow skirt having a slot therethrough, of a flexible metal plate overlying the slot interiorly of the skirt, and means securing the plate to the skirt to permanently shut off communication between the slot and the interior of the piston structure.

5. In a piston structure, the combination with a hollow skirt having a slot therethrough and an interiorly extending boss surrounding the slot, of closure means secured to the boss.

6. In a piston structure, the combination with a hollow skirt having a T-slot extending therethrough surrounded by an interiorly extending boss in the form of a V in outline, of sealing means secured against the inner face of said boss.

7. In a piston structure, the combination with a hollow skirt having a slot therethrough and an interiorly extending boss surrounding the slot, of sealing means for the slot comprising a plate adapted to lie against the inner face of the boss, a retainer engaging the plate in alignment with the boss, and securing means fastening the retainer and the plate to the boss.

8. In a piston structure, a skirt having a T-slot therethrough and an inwardly extending boss around the slot, a flexible sealing plate fixed against the inner face of the boss.

9. In a piston structure, a skirt having a slot therethrough, a boss extending inwardly of the skirt and surrounding the slot, a curved sealing plate extending over and engaging the inner face of the boss, and means securing the sealing plate to the boss.

10. In a piston structure, a hollow skirt having diametric pin bearings extending inwardly therefrom, said skirt being slotted intermediate the pin bearings, a continuous boss extending around the slot and inwardly from the skirt, and a sealing plate fixed to the inner face of the boss.

HERBERT C. EDWARDS.